United States Patent
Feigel

(10) Patent No.: US 10,612,613 B2
(45) Date of Patent: Apr. 7, 2020

(54) ELECTRONIC PARKING BRAKE

(71) Applicant: MANDO CORPORATION, Gyeonggi-do (KR)

(72) Inventor: Hans Joerg Feigel, Seoul (KR)

(73) Assignee: MANDO CORPORATION, Gyeonggi-Do (KR)

(*) Notice: Subject to any disclaimer, the term of this patent is extended or adjusted under 35 U.S.C. 154(b) by 9 days.

(21) Appl. No.: 15/979,460

(22) Filed: May 15, 2018

(65) Prior Publication Data
US 2018/0328430 A1    Nov. 15, 2018

(30) Foreign Application Priority Data

May 15, 2017    (KR) .................. 10-2017-0059841

(51) Int. Cl.
*B60T 13/74* (2006.01)
*B60T 17/22* (2006.01)
(Continued)

(52) U.S. Cl.
CPC ............ *F16D 65/18* (2013.01); *B60T 13/741* (2013.01); *B60T 13/746* (2013.01); *B60T 17/221* (2013.01);
(Continued)

(58) Field of Classification Search
CPC ........ F16F 65/18; B60T 13/74; B60T 13/741; B60T 13/746; B60T 17/221; B60T 2270/402

See application file for complete search history.

(56) References Cited

U.S. PATENT DOCUMENTS 5,090,518 A * 2/1992 Schenk ............... B60T 8/00
                                              188/157
6,138,801 A * 10/2000 Shirai ............... B60T 13/74
                                              188/157

(Continued)

FOREIGN PATENT DOCUMENTS

DE          196 11 911       10/1997
DE      11 2015 002 682       3/2017
(Continued)

OTHER PUBLICATIONS

Office Action dated Aug. 28, 2019 for German Patent Application No. 10 2018 111 573.3 and its English machine translation by Google Translate.

*Primary Examiner* — Thomas J Williams
*Assistant Examiner* — James K Hsiao
(74) *Attorney, Agent, or Firm* — Ladas & Parry, LLP

(57) ABSTRACT

An electronic parking brake is disclosed. The electronic parking brake includes a spindle unit, a power transmission unit, a first brake unit, and a second brake unit. The spindle presses or releases a piston of a caliper device moving forward or backward toward a wheel disc, toward or from the disc. The power transmission unit transmits received power to the spindle unit. The first brake unit includes a first motor connected to the power transmission so as to generate power needed to brake wheels of a vehicle. The second brake unit includes a second motor connected to the power transmission unit so as to generate power needed to brake the wheels of the vehicle. The second brake unit and the first brake unit are operated independently from each other.

14 Claims, 5 Drawing Sheets

(51) Int. Cl.
  *F16D 65/18* (2006.01)
  *F16D 55/226* (2006.01)
  *F16D 66/00* (2006.01)
  *F16D 125/40* (2012.01)
  *F16D 125/48* (2012.01)
  *F16D 121/24* (2012.01)

(52) U.S. Cl.
  CPC ......... *F16D 55/226* (2013.01); *F16D 65/183* (2013.01); *F16D 66/00* (2013.01); *B60T 2270/402* (2013.01); *F16D 2066/003* (2013.01); *F16D 2066/005* (2013.01); *F16D 2121/24* (2013.01); *F16D 2125/40* (2013.01); *F16D 2125/48* (2013.01)

(56) References Cited

U.S. PATENT DOCUMENTS

| | | | | |
|---|---|---|---|---|
| 6,173,820 | B1* | 1/2001 | Blosch | F16D 65/18 188/158 |
| 6,179,097 | B1* | 1/2001 | Schumann | F16D 65/18 188/162 |
| 6,189,661 | B1* | 2/2001 | Schaffer | B60T 13/741 188/157 |
| 6,969,127 | B2* | 11/2005 | Suzuki | B60T 13/741 303/122 |
| 2001/0023799 | A1* | 9/2001 | Engelhard | B60T 7/107 188/151 R |
| 2001/0045771 | A1* | 11/2001 | Corio | B60T 8/1703 303/20 |
| 2007/0068746 | A1* | 3/2007 | Chittka | F16D 65/18 188/72.6 |
| 2010/0217488 | A1* | 8/2010 | Nijakowski | B60T 17/221 701/48 |
| 2010/0314934 | A1* | 12/2010 | Leiter | B60T 7/042 303/20 |
| 2011/0042171 | A1* | 2/2011 | Knechtges | B60T 8/32 188/106 F |
| 2011/0272225 | A1* | 11/2011 | Febrer | B60T 7/12 188/106 P |
| 2013/0270047 | A1* | 10/2013 | Kim | F16D 65/18 188/72.1 |
| 2013/0282249 | A1* | 10/2013 | Heise | B60T 7/042 701/70 |
| 2014/0151164 | A1* | 6/2014 | Yokoyama | B60T 1/065 188/72.3 |
| 2014/0188362 | A1* | 7/2014 | Kotake | B60T 13/741 701/70 |
| 2015/0274139 | A1* | 10/2015 | Okada | B60T 8/17 701/70 |
| 2015/0362032 | A1* | 12/2015 | Son | F16D 65/18 188/72.1 |
| 2016/0032995 | A1* | 2/2016 | Nishino | F16D 55/225 188/72.3 |
| 2016/0223040 | A1* | 8/2016 | Watzek | F16D 65/50 |
| 2016/0290425 | A1* | 10/2016 | Baehrle-Miller | B60T 13/588 |
| 2016/0327104 | A1* | 11/2016 | Li | F16D 65/0006 |
| 2017/0028975 | A1* | 2/2017 | Suermann | B60T 13/586 |
| 2017/0072920 | A1* | 3/2017 | Besier | B60T 7/22 |
| 2017/0152027 | A1* | 6/2017 | Onfroy | B60T 13/741 |
| 2017/0328430 | A1* | 11/2017 | Lee | F16D 65/18 |
| 2018/0215368 | A1* | 8/2018 | Isono | B60T 7/042 |

FOREIGN PATENT DOCUMENTS

| | | |
|---|---|---|
| EP | 0 916 867 | 5/1999 |
| KR | 10-2006-0017421 | 2/2006 |
| KR | 10-2011-0072877 | 6/2011 |
| KR | 10-2012-0000841 | 1/2012 |

* cited by examiner

ELECTRONIC PARKING BRAKE

CROSS-REFERENCE TO RELATED APPLICATION

This application is based on and claims priority under 35 U.S.C. § 119 to Korean Patent Application No. 10-2017-0059841, filed on May 15, 2017 in the Korean Intellectual Property Office, the disclosure of which is incorporated by reference in its entirety.

BACKGROUND

1. Field

Embodiments of the present disclosure relate to an electronic parking brake, and more particularly to an electronic parking system configured to implement a parking function using operations of an electric motor.

2. Description of the Related Art

In general, a parking brake is a device to stop a vehicle so as not to move when the vehicle is parked, and serves to hold wheels of the vehicle so as not to rotate.

Recently, an electronic parking brake (EPB) system to electronically control operation of a parking brake has been widely used throughout the world. Such an EPB system is mounted on a typical disc brake and performs a parking brake function. Here, EPB systems are classified into a cable-puller-type EPB system, a motor-on-caliper (MOC) type EPB system, and a hydraulic-parking-brake type EPB system.

CITED REFERENCE

Patent Document

Korean Laid-Open Patent Publication No. 10-2011-0072877 (2011.06.29)

The above-mentioned cited reference relates to a motor-on-caliper (MOC) type electronic parking brake actuator structure. This MOC-type electronic parking brake actuator structure decelerates a motor of a vehicle using a plurality of gear devices, increases torque of the motor, and transmits the increased torque to an actuator and a caliper device, such that the MOC-type electronic parking brake actuator structure can allow the vehicle to be parked.

In recent years, vehicle-related technologies have focused on electric vehicles that use batteries instead of burning fossil fuels such as gasoline or diesel. For example, the above-mentioned electronic parking brake has recently been applied to electric vehicles so that the electronic parking brake controls the electric vehicles to be driven more stably.

SUMMARY

Therefore, it is an aspect of the present disclosure to provide an electronic parking brake capable of reducing production costs, and guaranteeing a stable parking performance even in a failure state.

Additional aspects of the invention will be set forth in part in the description which follows and, in part, will be obvious from the description, or may be learned by practice of the invention.

In accordance with an aspect of the present disclosure, an electronic parking brake includes: a spindle unit configured to press or release a piston of a caliper device moving forward or backward toward a wheel disc, toward or from the disc; a power transmission unit configured to transmit received power to the spindle unit; a first brake unit having a first motor connected to the power transmission unit so as to generate power needed to brake wheels of a vehicle; and a second brake unit having a second motor connected to the power transmission unit so as to generate power needed to brake the wheels of the vehicle, wherein the second brake unit and the first brake unit are operated independently from each other.

The first brake unit may include a first power-supply unit configured to provide power needed to brake wheels for vehicle parking and a first electronic controller configured to electronically control braking of the wheels.

The second brake unit may include a second power-supply unit configured to supply power needed to brake wheels for vehicle parking, and a second electronic controller configured to electronically control braking of the wheels.

The first motor may include a first motor shaft directly coupled to the power transmission unit. The second motor may include a second motor shaft directly coupled to the power transmission unit. The power transmission unit may include a first drive gear provided to the first motor shaft, a second drive gear provided to the second motor shaft, and at least one driven gear connected to the spindle unit and simultaneously engaged with the first drive gear and the second drive gear.

The first motor may include a first motor shaft directly coupled to the power transmission unit. The second motor may include a second motor shaft directly coupled to the power transmission unit. The power transmission unit may include a first drive gear provided to the first motor shaft, a second drive gear provided to the second motor shaft, at least one driven gear connected to the spindle unit, and at least one belt configured to connect the first and second drive gears to the at least one driven gear.

The at least one belt may include a first belt configured to connect the first drive gear to the driven gear, and a second belt configured to connect the second drive gear to the driven gear.

The first motor shaft and the second motor shaft may share a single main rotation shaft with each other. The main rotation shaft may be connected to the driven gear through the belt.

The driven gears acting as multi-stage gears may include a first driven gear and a second driven gear different in size from the first given gear. The first drive gear of the first motor shaft may be connected to one of the first driven gear and the second driven gear through a third belt. The second drive gear of the second motor shaft may be connected to the other one of the first driven gear and the second driven gear through a fourth belt.

The spindle unit may include a self-locking gear.

At least one of the first motor and the second motor may be a brush motor.

The electronic parking brake may further include a first sensor configured to sense operations of the first electronic controller and the second electronic controller, a second sensor configured to sense operations of the first motor and the second motor, a third sensor configured to sense an operation of the power transmission unit, and a fourth sensor configured to sense an operation of the spindle unit.

Each of the first sensor and the second sensor may be a current sensor.

The third sensor may be an angle sensor.

The fourth sensor may be a force sensor or a displacement sensor.

One of the first brake unit and the second brake unit may operate to release braking of wheels when the other one of the first and second brake units fails in braking.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
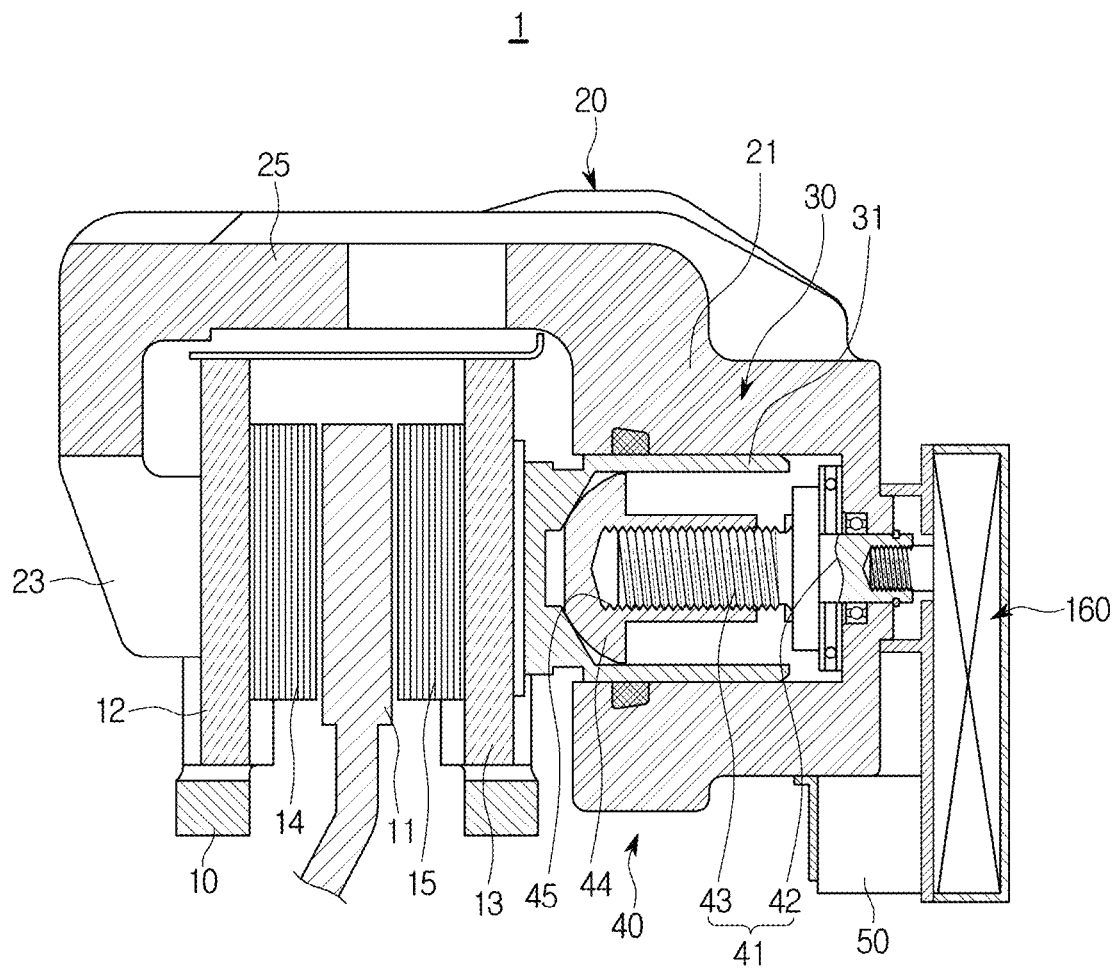
FIG. 1 is a view illustrating a caliper device provided with an electronic parking brake according to an embodiment of the present disclosure.

Reference will now be made in detail to the embodiments of the present disclosure, examples of which are illustrated in the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. In the drawings, the width, length, thickness, or the like of the component may be exaggerated or reduced for convenience and clarity of description. Throughout the disclosure, like reference numerals refer to like parts throughout the various figures and embodiments of the present disclosure.

FIG. 1 is a view illustrating a caliper device provided with an electronic parking brake according to an embodiment of the present disclosure.

Referring to FIG. 1, a caliper device 1 provided with an electronic parking brake may include a disc 11 which rotates together with wheels of a vehicle, a carrier 10 in which two pad plates 12 and 13 respectively connected to frictional pads 14 and 15 are spaced apart from each other by a predetermined distance, a caliper housing 20 which is slidably installed in the carrier 10 and operates the pad plates 12 and 13, and an actuator 30 provided with a piston 31 that is movable forward or backward toward the disc 11 within the caliper housing 20.

The carrier 10 may be mounted to a knuckle of a vehicle body through a mounting bolt. The disc 11 may be disposed between the pad plates 12 and 13 of the carrier 10. The caliper housing 20 may be slidably coupled to both ends of the carrier 10 through a guide rod (not shown). The frictional pads 14 and 15 may be respectively attached to inner surfaces of the pad plates 12 and 13. The pad plates 12 and 13 may be an outer pad plate 12 and an inner pad plate 13, respectively. The outer surface of the inner pad plate 13 may be arranged in contact with a front end of the piston 31. The outer surface of the outer pad plate 12 may be arranged in contact with a finger 23.

The caliper housing 20 may be slidably installed in the carrier 10 through one pair of guide rods. The caliper housing 20 may include a cylinder 21 in which the piston 31 is embedded, a finger 23 to operate the outer pad plate 12, and a connector 25 to interconnect the finger 23 and the cylinder 21.

The actuator 30 may include the piston 31 slidably inserted into the cylinder 21 of the caliper housing 20, a spindle unit 40 provided in the piston 31 so as to press or release the piston 31 by rotating or moving forward or backward in the piston 31, an electric motor 50 to drive the spindle unit 40, and a power transmission unit 160 to transmit rotational force of the electric motor 50 to the spindle unit 40.

The piston 31 may be slidably inserted into the cylinder 21 as described above. The piston 31 may be formed in a hollow cylindrical shape. In more detail, the inside of the piston 31 may have a concave cup shape.

The spindle unit 40 may include a spindle 41 rotatably installed in the cylinder 21 of the caliper housing 20, and an adjustment nut 42 configured to press or release the piston 31 by moving forward or backward according to rotation of the spindle 41.

The spindle 41 may include a connection support unit 42 and a male screw 43. The connection support unit 42 may be rotatably elongated to pass through the cylinder 21 at the rear end of the cylinder 21. The male screw 43 may be elongated by a predetermined length in the direction from the connection support unit 42 to an inner center part of the piston 31.

The adjustment nut 44 may be formed in a cylindrical shape, and may include a female screw 45 coupled to the male screw 43 of the spindle 41 in a manner that the adjustment nut 44 can move forward or backward in the axial direction by rotation of the spindle 41. Therefore, when the spindle 41 rotates forward or backward, the adjustment nut 44 can move forward or backward. In this case, forward movement of the adjustment nut 44 may press the piston 31, resulting in braking of vehicle wheels. The screw coupling of the spindle 41 and the adjustment nut 44 may be implemented using a self-locking gear scheme such as a screw-nut structure.

The electric motor 50 may receive power through manipulation of a switch (not shown) provided to a driver seat of the vehicle, and may convert electrical energy into mechanical rotational kinetic energy. For example, the electric motor 50 may be implemented as a brushless motor or a brush motor. Brake control based on the operation signal of the switch may be implemented by an electronic control unit (ECU) (not shown) of the vehicle.

The power transmission unit 160 to transmit rotational force of the electric motor 50 to the spindle unit 40 may include a decelerator. The decelerator may be implemented as any of a spur gear train composed of multi-stage gears, a planetary gear train composed of a sun gear, a satellite gear and a carrier, and a belt gear train connected through a belt.

Figure 2:
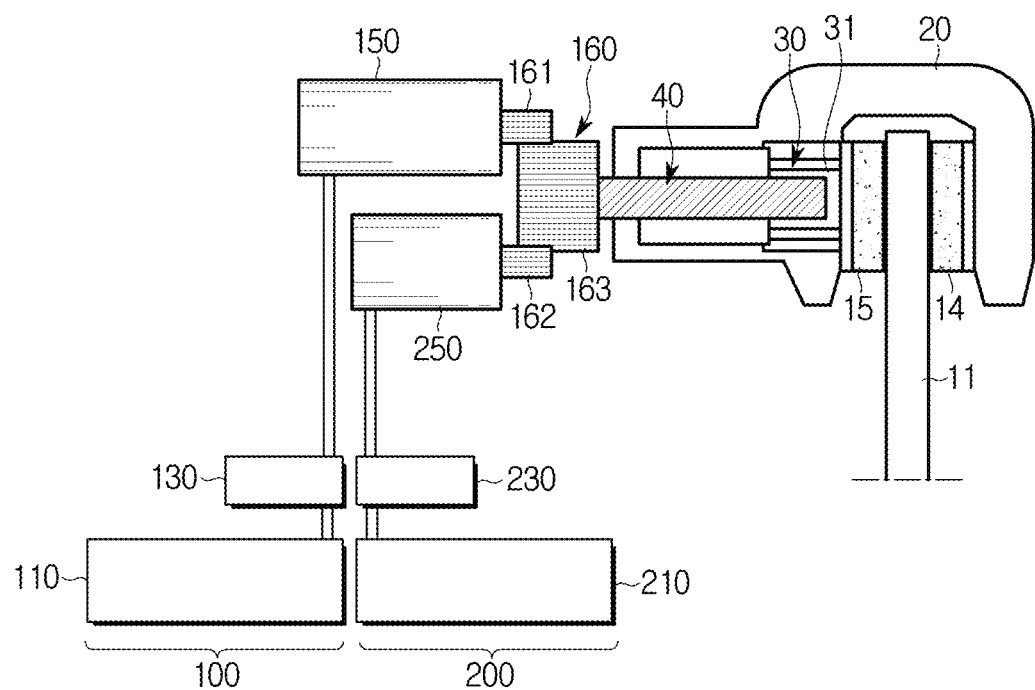
FIG. 2 is a view illustrating an electronic parking brake according to a first embodiment of the present disclosure.

FIG. 2 is a view illustrating an electronic parking brake according to a first embodiment of the present disclosure.

Referring to FIG. 2, the electronic parking brake according to the first embodiment may include a first brake unit 100 and a second brake unit 200 separated from each other. The first brake unit 100 may perform braking of wheels (RF, LF, RR, LR) of a vehicle to be parked. The second brake unit 200 may perform braking of wheels (RF, LF, RR, LR) of the vehicle in the same manner as in the first brake unit 100. The first brake unit 100 and the second brake unit 200 may be simultaneously connected to a single caliper device. The caliper devices may be respectively mounted to wheels of the vehicle, or one pair of caliper devices may be provided to rear wheels RR and LR or front wheels RF and LF.

The first brake unit 100 may include a first power-supply unit 110, a first electronic controller 130, and a first motor 150. The first power-supply unit 110 may provide power needed to brake wheels for parking of the vehicle. The first electronic controller 130 may electronically control braking of the wheels. The first motor 150 may mechanically press or release the piston 31 of the caliper housing 20.

The first power-supply unit 110 may provide various electronic components with power, and may generally refer to a battery of the vehicle. Specifically, the first power-supply unit 110 for use in an electric vehicle may be implemented as a battery pack for connecting a plurality of battery cells to a battery-cell control module.

The first electronic control unit 130 may be a system for controlling braking of wheels for vehicle parking, and may be implemented as a module in an electronic control unit (ECU) of the vehicle.

The first motor 150 may be mechanically coupled to the spindle unit 40 of the caliper housing 20 and the power transmission unit 160, and may include a first motor shaft (not shown). The first motor shaft may be provided with a first drive gear 161.

The second brake unit 200 may include a second power-supply unit 210 to provide power needed to brake wheels, a second electronic controller 230 to control braking of the wheels, and a second motor 250 to press or release a piston of the caliper.

The second power-supply unit 210 may be provided separately from the first power-supply unit 110. Although a battery of the vehicle is generally provided as a single component, an object for controlling the battery is divided into the first electronic controller 130 and the second electronic controller 230 as described above. Therefore, the second power-supply unit 210 may be electrically isolated to be dependent upon a target subject to be controlled. In other words, whereas the first power-supply unit 110 and the second power-supply unit 210 may be externally implemented as a single battery pack, the first power-supply unit 110 and the second power-supply unit 210 may be internally electrically isolated from each other.

The second electronic controller 230 may be a system for controlling braking of wheels of the vehicle, and may be implemented as a module in a main electronic control unit (ECU) of the vehicle. The second electronic controller 230 and the first electronic controller 130 may be provided independently from each other. That is, the first electronic controller 130 and the second electronic controller 230 may be electrically isolated from each other.

The second motor 250 may be directly coupled to the spindle unit 40 of the caliper housing 20 using the power transmission unit 160, and may include a second motor shaft (not shown). The second motor shaft may be provided with a second drive gear 162.

In accordance with the first embodiment, the first drive gear 161 of the first motor 150 and the second drive gear 162 of the second motor 250 may be gear-coupled to a driven gear 163 of the power transmission unit 160 connected to the spindle unit 40. The driven gear may be larger in size than the drive gear, such that the driven gear may decelerate or reduce a rotation speed of the motor and may transmit the decelerated rotation speed of the motor to the spindle unit 40.

In the above-mentioned electronic parking brake according to the first embodiment, although any one of the first brake unit 100 and the second brake unit 200 fails in braking, the other one brake unit can be driven by the electronic controller operating independently, such that wheels of the vehicle can be more stably braked. In addition, the above-mentioned electronic parking brake may apply a self-locking gear to the spindle unit, and may implement the motor using a brushless motor in which an electronic control circuit is no longer required, resulting in reduction of production costs.

Figure 3:
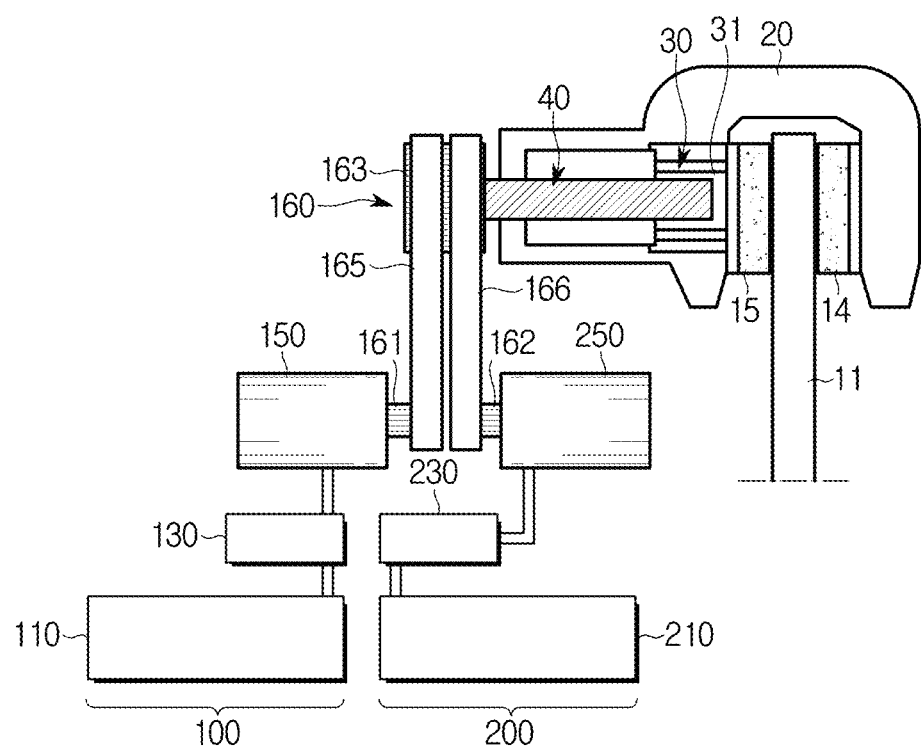
FIG. 3 is a view illustrating an electronic parking brake according to a second embodiment of the present disclosure.

FIG. 3 is a view illustrating an electronic parking brake according to a second embodiment of the present disclosure. For convenience of description and better understanding of the present disclosure, the following second embodiment will be described centering upon constituent elements different from those of the first embodiment, and the same reference numerals are given to the same constituent elements although illustrated in different drawings.

Referring to FIG. 3, the electronic parking brake according to the second embodiment may include a first brake unit 100 and a second brake unit 200 configured to operate independently from each other. The first brake unit 100 may include a first power-supply unit 110 to provide power needed to brake wheels of a vehicle, a first electronic controller 130 to control braking of the wheels, and a first motor 150 to press or release a piston 31 of a caliper housing 20. The second brake unit 200 may include a second power-supply unit 210 to provide power needed to brake wheels of the vehicle, a second electronic controller 230 to control braking of the wheels, and a second motor 250 to press or release the piston 31 of the caliper housing 20.

In accordance with the second embodiment, a first drive gear 161 of the first motor 150 may be coupled to a driven gear 163 of a power transmission unit 160 connected to a spindle unit 40, through a first belt 165. A second drive gear 162 of the second motor 250 may be coupled to the driven gear 163 of the power transmission unit 160 connected to the spindle unit 40, through a second belt 166.

As a result, the first brake unit 100 and the second brake unit 200 may simultaneously operate to rapidly implement a parking brake function. Alternatively, one of the first brake unit 100 and the second brake unit 200 may operate as a main brake unit in a normal state, and the other one brake unit may operate as a sub brake unit in a failure state of the main brake unit.

Although not shown in FIG. 3, when only one of the first belt 165 and the second belt 166 simultaneously engaged with one driven gear 163 operates, the other one belt may operate as load without disturbing rotation of the driven gear 163. Alternatively, a one-way clutch (not shown) and the like may be mounted to the electronic parking brake of the second embodiment, such that rotational force is prevented from being transferred to other motors through the belt(s).

Figure 4:
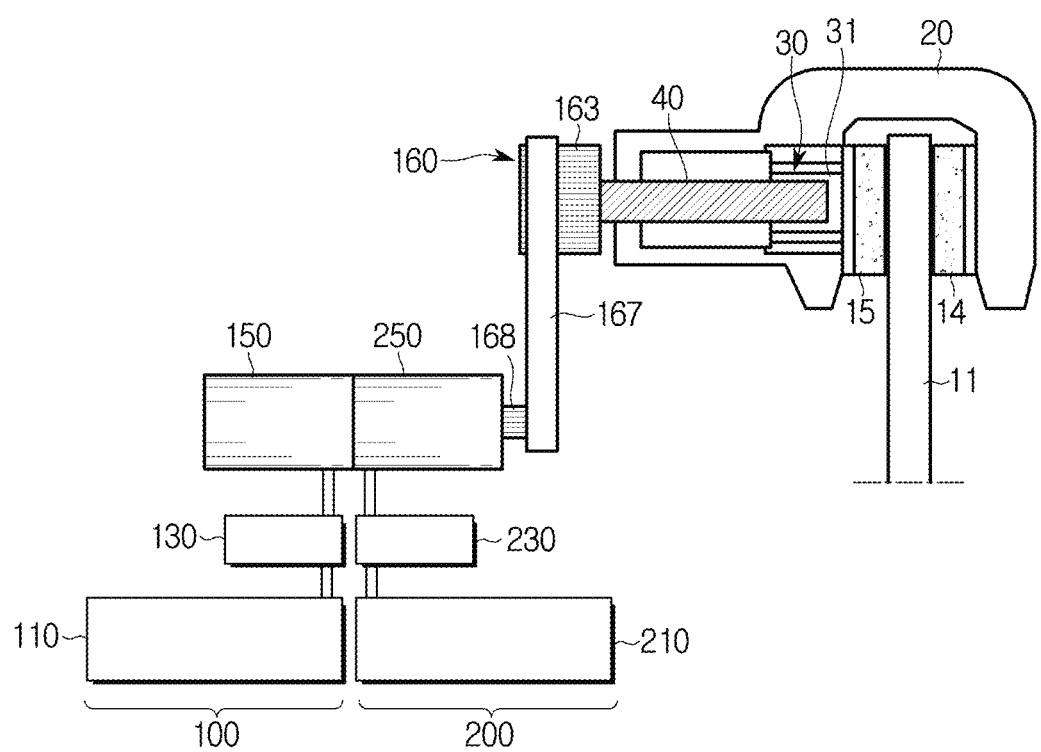
FIG. 4 is a view illustrating an electronic parking brake according to a third embodiment of the present disclosure.

FIG. 4 is a view illustrating an electronic parking brake according to a third embodiment of the present disclosure. For convenience of description and better understanding of the present disclosure, the following third embodiment will be described centering upon constituent elements different from those of the first and second embodiments, and the same reference numerals are given to the same constituent elements although illustrated in different drawings.

Referring to FIG. 4, the electronic parking brake according to the third embodiment may include a first brake unit 100 and a second brake unit 200 configured to operate independently from each other. The first brake unit 100 may include a first power-supply unit 110 to provide power needed to brake wheels of the vehicle, a first electronic controller 130 to control braking of the wheels, and a first motor 150 to press or release a piston 31 of a caliper housing 20. The second brake unit 200 may include a second power-supply unit 210 to provide power needed to brake wheels of the vehicle, a second electronic controller 230 to control braking of the wheels, and a second motor 250 to press or release the piston 31 of the caliper housing 20.

The electronic parking brake according to the third embodiment may allow the first motor 150 and the second motor 250 to share a single main rotation shaft (not shown) with each other. The main rotation shaft may be provided with a single third drive gear 168. The third drive gear 168 may be coupled to a driven gear 163 of a power transmission unit 160 connected to a spindle unit 40, through a third belt 167.

As a result, the first brake unit 100 and the second brake unit 200 may simultaneously operate to rapidly implement a parking brake function. Alternatively, one of the first brake unit 100 and the second brake unit 200 may operate as a main brake unit in a normal state, and the other one brake unit may operate as a sub brake unit in a failure state of the main brake unit.

Figure 5:
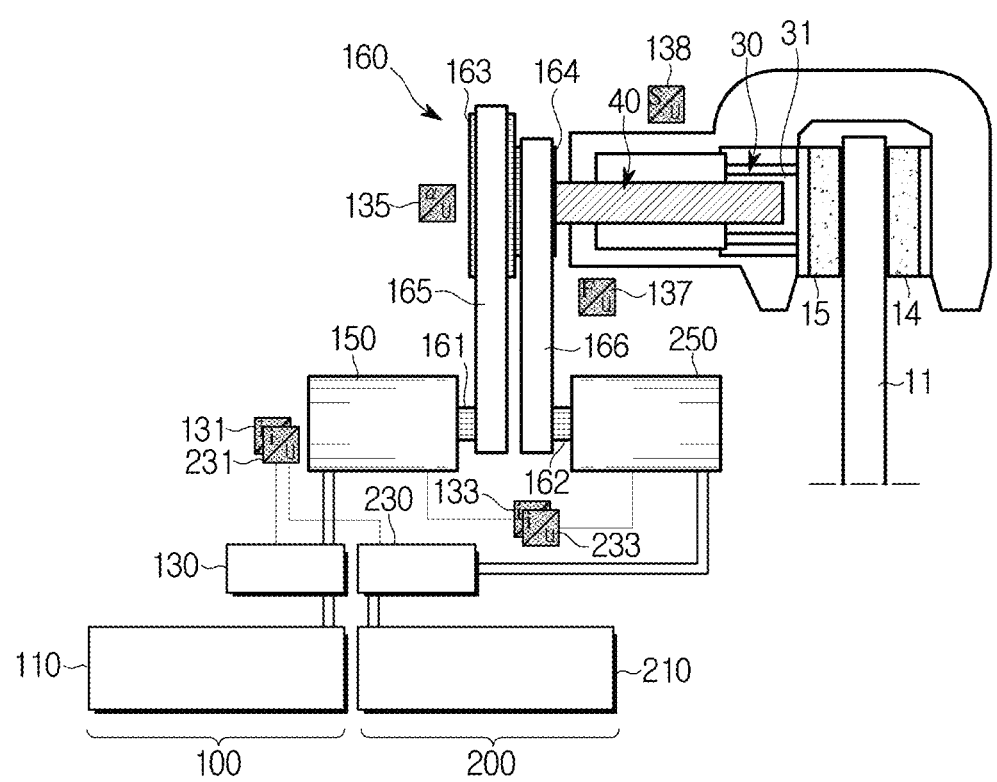
FIG. 5 is a view illustrating an electronic parking brake according to a fourth embodiment of the present disclosure.

FIG. 5 is a view illustrating an electronic parking brake according to a fourth embodiment of the present disclosure. For convenience of description and better understanding of the present disclosure, the following fourth embodiment will be described centering upon constituent elements different from those of the first and third embodiments, and the same reference numerals are given to the same constituent elements although illustrated in different drawings.

Referring to FIG. 5, the electronic parking brake according to the fourth embodiment may include a first brake unit 100 and a second brake unit 200 configured to operate independently from each other. The first brake unit 100 may include a first power-supply unit 110 to provide power needed to brake wheels of the vehicle, a first electronic controller 130 to control braking of the wheels, and a first motor 150 to press or release a piston 31 of a caliper housing 20. The second brake unit 200 may include a second power-supply unit 210 to provide power needed to brake wheels of the vehicle, a second electronic controller 230 to control braking of the wheels, and a second motor 250 to press or release the piston 31 of the caliper housing 20.

The electronic parking brake according to the fourth embodiment may include multi-stage driven gears 163 and 164 of a power transmission unit 160 connected to a spindle unit 40. In other words, the driven gears may include a first driven gear 163 and a second driven gear 164 different in size from the first driven gear 163.

A first drive gear 161 of the first motor 150 may be coupled to the first driven gear 163 of the power transmission unit 160 through a first belt 165. A second drive gear 162 of the second motor 250 may be coupled to the second driven gear 164 of the power transmission unit 160 through a second belt 166.

As a result, the first brake unit 100 and the second brake unit 200 may simultaneously operate to rapidly implement a parking brake function. Alternatively, one of the first brake unit 100 and the second brake unit 200 may operate as a main brake unit in a normal state, and the other one brake unit may operate as a sub brake unit in a failure state of the main brake unit.

The first motor 150 connected to the first driven gear 163 through the first belt 165 and the second motor 250 connected to the second driven gear 154 through the second belt 166 may be configured to have different capacities, resulting in reduction of production costs. For example, the second motor 250 to be used for emergency purposes may be smaller in size than the first motor 159, and may be coupled to the second driven gear 164 having a lower rotation ratio than the first driven gear 163, resulting in rapid braking of the vehicle.

The electronic parking brake according to the fourth embodiment may include a plurality of sensors, such that the electronic parking brake may more accurately perform the parking brake operation.

For example, the electronic parking brake according to the fourth embodiment may include first sensors 131 and 231 to respectively sense an operation of the first electronic controller 130 and an operation of the second electronic controller 230, second sensors 133 and 233 to respectively sense an operation of the first motor 150 and an operation of the second motor 250, a third sensor 135 to sense an operation of the power transmission unit 160, and fourth sensors 137 and 138 to sense an operation of the spindle unit 40.

The first sensor 131 may include a current sensor to detect whether the first electronic controller 130 normally operates, and the second sensor 231 may include a current sensor to detect whether the second electronic controller 230 normally operates. Likewise, the second sensor 133 may include a current sensor to detect whether the first motor 150 normally operates, and the second sensor 233 may include a current sensor to detect whether the second motor 250 normally operates.

The third sensor 135 may detect whether the power transmission unit 160, i.e., the driven gears 163 and 164, normally operates, and may recognize the operation state of the power transmission unit 160 by detecting rotation or non-rotation of the driven gears 163 and 164, such that the third sensor 135 may be implemented as an angle sensor. For example, only one third sensor 135 may be used as necessary.

The fourth sensors 137 and 138 may detect whether the spindle unit 40 normally operates. The spindle unit 40 may press the frictional pads 14 and 15 by moving forward or backward in the longitudinal direction, such that the spindle unit 40 may be implemented as any one of a force sensor 137 and a displacement sensor 138.

As described above, the above-mentioned electronic parking brake according to the embodiments of the present disclosure may include the first brake unit 100 and the second brake unit 200 which operate independently from each other within the vehicle, such that the electronic parking brake may perform braking of wheels of the vehicle even when any one of the first and second brake units 100 and 200 fails in braking, resulting in implementation of a more stable parking operation of the vehicle.

In addition, the electronic parking brake according to the embodiments of the present disclosure may include a plurality of sensors 131, 133, 135, 137, 138, 231, and 233, and may control the plurality of sensors 131, 133, 135, 137, 138, 231, and 233 using the electronic controllers 130 and 230, thereby more accurately and effectively implementing parking brake functions of the respective wheels.

As is apparent from the above description, the electronic parking brake according to the embodiments of the present disclosure may allow a vehicle to include a first brake unit and a second brake unit which operate independently from each other, and may connect the first brake unit and the second brake unit to the same caliper device. As a result, although any one of the first and second brake units fails to operate, the remaining one brake unit normally operates, such that the electronic parking brake may allow the vehicle to be normally parked using the normally operating brake unit.

The electronic parking brake according to the embodiments of the present disclosure may easily connect the first brake unit and the second brake unit, each of which includes a power-supply unit, an electronic controller, and a motor, to a spindle unit of the caliper device using a power transmission unit. In this case, the power transmission unit may be implemented in various ways, such as multi-stage gears, a belt, and a worm gear, according to shapes or formats.

The electronic parking brake according to the embodiments of the present disclosure may mount a self-locking gear to the spindle unit of the caliper device, and may include a brush motor in which an electronic control circuit is no longer required, resulting in reduction of production costs.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An electronic parking brake comprising:
    a spindle unit configured to press or release a piston of a caliper device moving forward or backward toward a wheel disc, toward or from the disc;
    a power transmission unit configured to transmit received power to the spindle unit;
    a first brake unit having a first motor connected to the power transmission unit so as to generate power needed to brake wheels of a vehicle; and
    a second brake unit having a second motor connected to the power transmission unit so as to generate power needed to brake the wheels of the vehicle,
    wherein:
    the second brake unit and the first brake unit are operated independently from each other;
    the first motor includes a first motor shaft coupled to the power transmission unit;
    the second motor includes a second motor shaft coupled to the power transmission unit; and
    wherein the power transmission unit includes: a first drive gear provided to the first motor shaft, a second drive gear provided to the second motor shaft, at least one driven gear connected to the spindle unit, and at least one belt configured to connect the first and second drive gears to the at least one driven gear.

2. The electronic parking brake according to claim 1, wherein the first brake unit includes:
    a first power-supply unit configured to supply power needed to brake wheels for vehicle parking; and
    a first electronic controller configured to electronically control braking of the wheels.

3. The electronic parking brake according to claim 2, wherein the second brake unit includes:
    a second power-supply unit configured to supply power needed to brake wheels for vehicle parking; and
    a second electronic controller configured to electronically control braking of the wheels.

4. The electronic parking brake according to claim 3, wherein:
    the first motor shaft is directly coupled to the power transmission unit; and
    the second motor shaft is directly coupled to the power transmission unit.

5. The electronic parking brake according to claim 3, wherein the spindle unit includes a self-locking gear.

6. The electronic parking brake according to claim 3, wherein at least one of the first motor and the second motor is a brush motor.

7. The electronic parking brake according to claim 3, further comprising:
    a first sensor configured to sense operations of the first electronic controller and the second electronic controller;
    a second sensor configured to sense operations of the first motor and the second motor;
    a third sensor configured to sense an operation of the power transmission unit; and
    a fourth sensor configured to sense an operation of the spindle unit.

8. The electronic parking brake according to claim 7, wherein each of the first sensor and the second sensor is a current sensor.

9. The electronic parking brake according to claim 7, wherein the third sensor is an angle sensor.

10. The electronic parking brake according to claim 7, wherein the fourth sensor is a force sensor or a displacement sensor.

11. The electronic parking brake according to claim 3, wherein one of the first brake unit and the second brake unit operates to release braking of wheels when the other one of the first and second brake units fails in braking.

12. The electronic parking brake according to claim 1, wherein the at least one belt includes:
    a first belt configured to connect the first drive gear to the driven gear; and
    a second belt configured to connect the second drive gear to the driven gear.

13. The electronic parking brake according to claim 1, wherein:
    the first motor shaft and the second motor shaft are configured to share a single main rotation shaft with each other, and
    wherein the main rotation shaft is connected to the driven gear through the belt.

14. The electronic parking brake according to claim 1, wherein:
    the driven gears acting as multi-stage gears include a first driven gear and a second driven gear different in size from the first given gear;
    the first drive gear of the first motor shaft is connected to one of the first driven gear and the second driven gear through a third belt; and
    the second drive gear of the second motor shaft is connected to the other one of the first driven gear and the second driven gear through a fourth belt.

* * * * *